United States Patent
Haddad

(10) Patent No.: US 9,245,339 B2
(45) Date of Patent: Jan. 26, 2016

(54) GARMENT FITMENT SYSTEM

(71) Applicant: George Haddad, Ottawa (CA)

(72) Inventor: George Haddad, Ottawa (CA)

(\*) Notice: Subject to any disclaimer, the term of this patent is extended or adjusted under 35 U.S.C. 154(b) by 149 days.

(21) Appl. No.: 14/169,559

(22) Filed: Jan. 31, 2014

(65) Prior Publication Data

US 2015/0221090 A1 Aug. 6, 2015

(51) Int. Cl.
*G06K 9/00* (2006.01)
*G06T 7/00* (2006.01)

(52) U.S. Cl.
CPC ............... *G06T 7/0022* (2013.01); *G06T 7/004* (2013.01); *G06T 2207/10004* (2013.01); *G06T 2207/30196* (2013.01)

(58) Field of Classification Search
None
See application file for complete search history.

(56) References Cited

U.S. PATENT DOCUMENTS 6,490,534 B1 \* 12/2002 Pfister .................. A41H 1/00
382/173

FOREIGN PATENT DOCUMENTS

WO WO 2013058978 A1 \* 4/2013 ............. G01B 11/00

\* cited by examiner

*Primary Examiner* — Stephen R Koziol
*Assistant Examiner* — Amandeep Saini
(74) *Attorney, Agent, or Firm* — MU Patents; Timothy Marc Shropshire

(57) ABSTRACT

A computer-implemented method for determining a subject's fitment for a garment, has the steps of receiving a body type, receiving a body stance, receiving two or more photos of the subject comprising at least a side view photo and a front or rear view photo, determining the scale of each of the two or more photos, determining certain measurements from the two or more photos using the scale, and calculating further measurements from the determined measurements. The method may have the further steps of receiving one or more measurements comprising at least a height from the subject, and using the one or more measurements from the subject to determine a scale of each of the two or more photos. Alternatively, the scale of each of the two or more photos may be determined by a depth-sensing camera.

9 Claims, 2 Drawing Sheets

| Step | No. |
|---|---|
| Receive measurements of height, chest, stomach, weight, waist and neck | 10 |
| Receive description of body type from subject | 20 |
| Receive description of body stance from subject | 30 |
| Receive further information from subject (optional) | 35 |
| Photos taken of front, side and back of subject | 40 |
| Scale of photos determined based on height determination | 45 |
| Determine shoulder width from front photo using height and shoulder formula; determine shoulder height | 50 |
| Determine body indents from side view photo including neck indent, shoulder blade, waist indent and seat indent | 55 |
| Determine sleeve length from side or front photo using height and sleeve formula | 60 |
| Determine jacket length from front or rear photo using height and jacket formula | 70 |
| Determine outseam from side photo using height and formula | 80 |

Fig. 1 (Prior Art)

| Receive measurements of height, chest, stomach, weight, waist and neck | 10 |

| Receive description of body type from subject | 20 |

| Receive description of body stance from subject | 30 |

| Receive further information from subject (optional) | 35 |

| Photos taken of front, side and back of subject | 40 |

| Scale of photos determined based on height determination | 45 |

| Determine shoulder width from front photo using height and shoulder formula; determine shoulder height | 50 |

| Determine body indents from side view photo including neck indent, shoulder blade, waist indent and seat indent | 55 |

| Determine sleeve length from side or front photo using height and sleeve formula | 60 |

| Determine jacket length from front or rear photo using height and jacket formula | 70 |

| Determine outseam from side photo using height and formula | 80 |

Fig. 2

GARMENT FITMENT SYSTEM

CROSS-REFERENCE TO RELATED APPLICATIONS

This patent application claims priority to Canadian patent application number entitled "Garment Fitting System."

STATEMENT REGARDING FEDERALLY SPONSORED RESEARCH OR DEVELOPMENT

Not Applicable.

INCORPORATION BY REFERENCE OF MATERIAL SUBMITTED ON A COMPACT DISC

Not Applicable.

FIELD OF THE INVENTION

The invention relates to a system for determining measurements for tailoring a garment.

BACKGROUND OF THE INVENTION

Garments have been tailored for centuries, made by hand in order to provide a custom fit, known in the art as "bespoke". In more recent times, detailed measurements of a subject are taken, and a garment is made by machine in accordance with those measurements, known in the art as "made-to-measure". This may be contrasted with "off-the-rack", wherein clothes are made to ideal sizes and sold with or without alteration. Made-to-measure suits provide superior fit and wearability in comparison with off-the-rack clothing, and provide a fit close to that of bespoke tailoring.

In order to manufacture a made-to-measure garment, a number of measurements (in some procedures, 42 measurements) are taken of the subject, typically by a tailor, a sales clerk or an assistant. This requires the subject for the made-to-measure garment to attend in person at the tailor's place of business to be measured. A sample prior art form for a made-to-measure garment is shown in FIG. 1.

The measurements taken for a jacket may include chest, overarm, finished ½ jacket waist, stomach, jacket seat, half back, point to point, left and right sleeve length, coat length, body indents, arm position, shoulder heights, neck sizes, and biceps. For pants, measurements taken may include waist, seat, rise, stride, knee, bottom circumference, left and right inseam, left and right outseam, lower front waistband. For a vest, measurements may include chest, vest opening, back length, front length. For a shirt, measurements may include collar size, chest, waist, sleeve length, yoke, body length, and cuff. Taking these measurements consumes a significant amount of both the tailor's and subject's time and is subject to error by the measurer.

There are fewer and fewer master tailors today that are able to measure and prepare a garment on a made-to-measure, so oftentimes made-to-measure means that the subject is measured, and the measurements are sent to the factory where the garment is made based on those measurements and other observations of the tailor or other person who makes the measurements. The quality of the measurements is therefore paramount and an increase in the accuracy of measurements will reduce returned garments or complaints about the fit.

Therefore there is a need for a garment fitment system which allows accurate measurements to be taken remotely by the subject without the need to attend at a tailor or for assistance by another person. As well, a reduction in the number of measurements made can result in a shorter measurement time.

SUMMARY OF THE INVENTION

A computer-implemented method for determining a subject's fitment for a garment has the steps of receiving a body type, receiving a body stance, receiving two or more photos of the subject comprising at least a side view photo and a front or rear view photo, determining the scale of each of the two or more photos, determining a point to point measurement from the front or rear view photo using the scale, determining a shoulder height measurement from the front or rear view photo using the scale, determining one or more body indent measurements from the side view photo using the scale, determining a sleeve length measurement from the two or more photos using the scale, determining a body length measurement from the front or rear view photo using the scale, and calculating further measurements from the determined measurements.

In one embodiment, the method has the further steps of receiving one or more measurements comprising at least a height from the subject; and using the one or more measurements from the subject to determine a scale of each of the two or more photos. In an embodiment, one or more measurements are at least the height, and circumference of the chest, waist, neck and stomach.

In one embodiment the scale of each of the two or more photos is determined by a depth-sensing camera. The outseam may be determined from the side view photo using the scale, or may be determined from each of a right side view photo and a left side view photo.

In one embodiment, the two or more photos comprise a front view photo, a rear view photo, a left view photo, and a right view photo. In an embodiment, the body indents are determined by virtually positioning the shoulder blades against a vertical reference, and measuring the head indent, neck indent, waist indent and seat indent from the vertical reference. The subject may provide further information on fit preference. The determined measurements and calculated measurements form a fit profile for a subject and the fit profile is shared with garment manufacturers.

Also described is a garment fitment system, comprising a processor for performing calculations, and a camera for taking photos of a subject, wherein a body type and body stance of a subject are provided to the processor, the camera takes two or more photos of the subject comprising at least a side view and a front or back view, the processor determines a scale for each of the photos, and the processor determines a point to point measurement, a shoulder height measurement, one or more body indent measurements, sleeve length measurement, and a body length measurement from the two or more photos, and wherein the processor calculates further measurements from the determined measurements.

In one embodiment, the processor receives one or more measurements comprising at least a height from the subject; and the processor uses the one or more measurements from the subject to determine a scale of each of the two or more photos. In an embodiment the one or more measurements are at least the height, and circumference of the chest, waist and neck and stomach.

In an embodiment, the camera is a depth-sensing camera and the scale of each of the two or more photos is determined by the camera. The processor may determine an outseam measurement. The two or more photos comprise a front view photo, a rear view photo, a left view photo, and a right view photo.

The body indents may be determined by virtually positioning the shoulder blades against a vertical reference, and measuring the head indent, neck indent, waist indent and seat indent from the vertical reference. In one embodiment the determined measurements and calculated measurements form a fit profile for a subject and the fit profile is shared with garment manufacturers.

BRIEF DESCRIPTION OF THE DRAWINGS

FIG. 1 shows a prior art form to be filled for a made to measure suit; and

FIG. 2 shows a flowchart of the method of calculating measurements for a garment.

DETAILED DESCRIPTION

The present invention is a system that provides measurement information for a made-to-measure garment by means of several measurements given by the subject to be measured for a garment, and one or more photos taken of the subject.

In one embodiment the system uses a smartphone with a camera and a program loaded thereon known as an app. The subject may input personal measurement information into the app, and the camera of the smartphone may be used by the app to acquire full-length photos of the subject. Given the measurements input by the subject, the server determines a scale of the photos, and is able to determine the remaining measurements for the garment by i) observation of various lengths from the photos, and ii) calculation of garment measurements therefrom according to formulae. The measurements for the made-to-measure garment are given to the subject through the app.

In another embodiment a website is used to receive measurement information from the subject and the subject uses a camera to take photos of himself, which he uploads to the website. The website communicates with a server which receives the photos and measurement information provided by the subject. The subject provides the measurements to the smartphone app or to a website, and uploads the photos taken by the smartphone or by any camera to the server through the website or the app. Given the measurements input by the subject, the server determines a scale of the photos, and is able to determine the remaining measurements for the garment by i) observation of various lengths from the photos, and ii) calculation of garment measurements therefrom according to formulae. The measurements for the made-to-measure garment are given to the subject by the server, or alternatively may be transmitted directly to a manufacturer of the garment.

Figure 1:
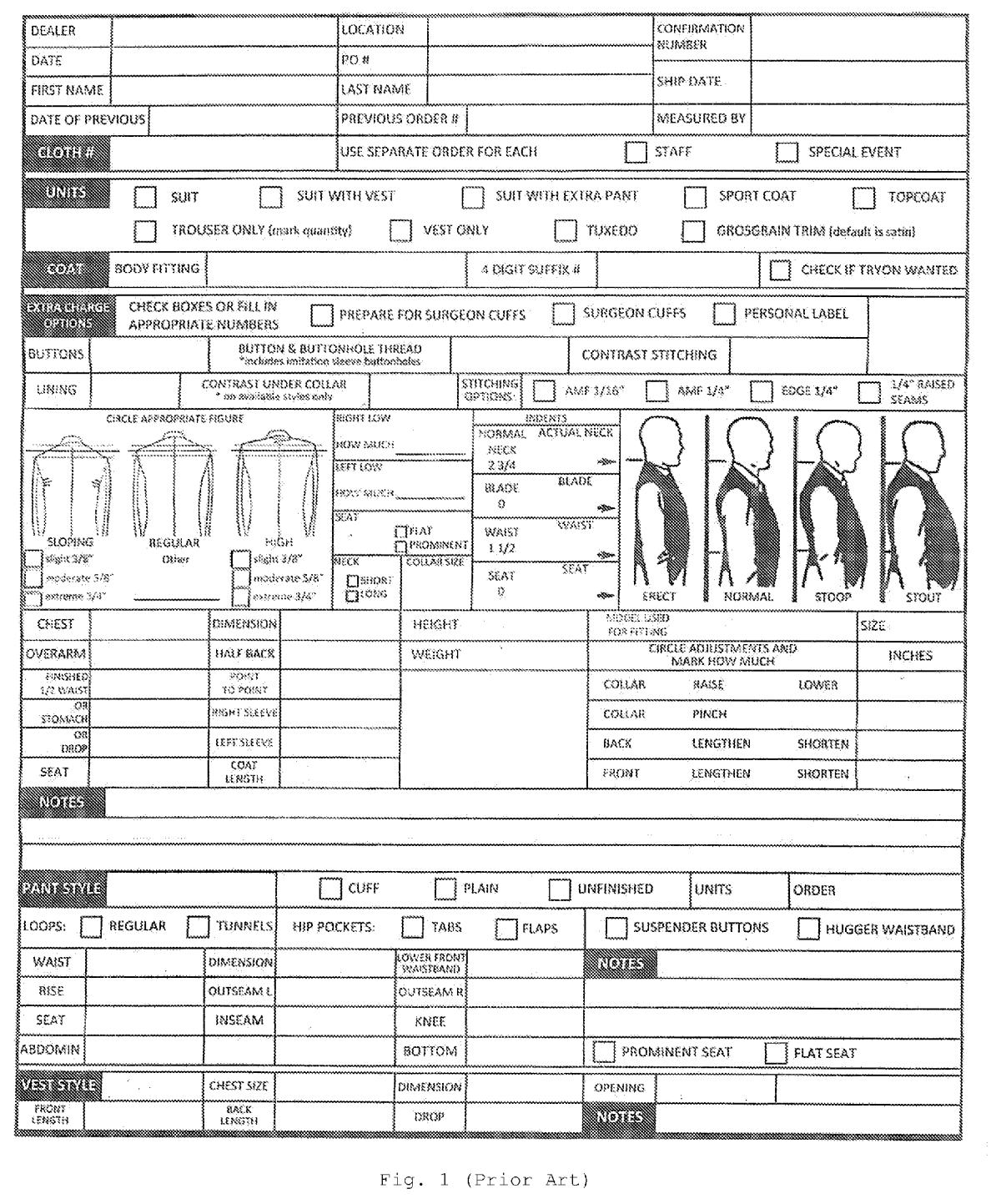

With reference to FIG. 1, in step 10 the subject provides body measurements such as height, measured from the bottom of the feet to the top of the head, "chest" measuring the circumference of the chest under the armpits, "waist" measuring the circumference of the waist band of the trousers, "stomach" measuring the circumference of the stomach (at the navel), only if the subject is stout. The subject also provides the "neck", the circumference of the neck, and his or her current weight. In step 20, the subject provides a selection of body type: for example, normal, athletic or stout (portly). Stout or portly may also be divided into portly and half-portly for greater accuracy of the measurements and calculations. In step 30 the subject makes a selection of body stance: for example, erect, normal, or stoop.

In step 35, further information is optionally provided by the subject. It may include any or all of: chest orientation (flat, normal or prominent); seat orientation (flat, very flat, normal, prominent, very prominent); overarm (normal, heavy, very heavy); stomach (little flat, normal, little forward); back (normal, curved or rounded); neck (short, normal or long). Further, fit preference may be given, wherein the garment may be regular, moderate, trim or slim.

In step 40 the subject uses a camera to take photos of one or more of the front, back, right and left sides of the subject. In a preferred embodiment, all of the front, rear, left and right side photos are taken. In another embodiment, the subject only provides a front and a side view. The subject wears light-weight fitted clothing for the photos, without a jacket, so that the body shape and indents can be determined from the photos. The photos may be taken by the subject by positioning their phone on a stand, or may be taken by a friend or assistant of the subject. If the camera or smartphone is able to detect distance to the subject with each photo, then this information is recorded with the photos.

The photos and distance information may be sent to the server, and further calculation performed on the server, or alternatively may remain in the app on the smartphone, wherein further calculation is performed within the app on the smartphone.

In step 45, the app then determines scale from the given values and the photographs, for use in determining proportions and measurements. For example, knowing the height, the app is able to provide scale for the photo, and thereby determine measurements such as outseam and sleeve length. Height is not necessary where a depth-sensing camera is able to determine the distance of the subject from the camera, and therefore the scale to calculate height. Alternatively, if the distance of the subject from the camera is known, then the height and scale may also be determined.

The provision of weight allows fine-tuning but is not used overtly in the calculations. For example, if a person is heavy for their height, then measurements for the garment may be biased to a larger size. Also, weight may be retained by the system to compare with future garment measurements; if weight increases then adjustment may be made based on previous size and satisfaction level.

In step 50, the point to point (width from one shoulder point to the opposite shoulder point), is determined from the front photo once the scale is established. The point to point is simply the distance between the outside of the shoulders from the front or rear view. This measurement is taken and modified later to provide a measurement for a garment.

The shoulder orientation (high, normal or sloping shoulders) is determined by measuring the drop from the collar height to the shoulder height. This determines a shoulder orientation, for example, high, normal or sloping, so the garment may be adjusted accordingly. This can also determine whether one shoulder is lower than the other, which is a common situation when measuring for garments. Often a shoulder may be lower in accordance with the handedness of the subject.

In step 55, from the side view the body indents from vertical may be determined. The app, from the side view, positions the shoulder blades (back) of the subject against a virtual vertical reference line. In another embodiment the virtual reference is apart from the blades to allow for a blades indent. From this vertical line, the head indent, where the head is forward of the shoulder blades, and the neck indent, where the neck is recessed from a line between the shoulder blades and the back of the head, can be determined. The waist indent is determined similarly, as well as the seat indent. In one embodiment, the orientation of the back relative to the vertical plane provides the system with a determination of stoop. The system compares the side view against a vertical reference, and compares the profile with standard profiles for erect, normal and stooped posture.

In step 60, sleeve length may be determined from the front or side view photo, and is determined in relationship to the height scale. The sleeve length may or may not include shoulder padding (depending on whether the subject is wearing a jacket having padding or not), and is measured from the point to the end of the sleeve.

Similarly, in step 70 the body length may be determined by the length from the collar base to the waist. Jacket length is determined from the collar height (base of the collar) to the bottom of the jacket (longer than the distance to the waist), preferably measured from the rear view. The system may recommend a length based on cut preferences or the length may be selected by the subject. The pant waist may be determined from the front or rear view, where the shirt ends and the pant begins. The front waist height and rear waist height may be compared to determine if the front or back waistband of the pant should be lowered or raised. For example, portly men will wear the front waistband lower, below the stomach, and with front and rear photo comparison the front will appear lower and can be cut accordingly, to provide a more comfortable fit.

In step 80 pant outseam (from the top of the waist band to the bottom of the pants) may be determined for each side based on the length of the pants, minus a standardized measurement for the shoes, such that the pants break may be located on the front of the shoe. In a preferred embodiment, the outseam is measured from both sides, in order to account for a shorter leg on one side, or an uneven waist, for example. Inseam may be determined outseam minus rise of the pant, wherein rise may be determined by the system measuring the front of the pants from the top of the inseam to the waist.

Measurements taken from one view may be verified using another view. For example, the outseam from the side view may be verified for length with the front view. The outseam of each side may have a different length, therefore a preferred embodiment uses photos of each side of the subject, to determine the outseam of each side individually. Alternatively, the outseam may be measured from a front view on each side, from the ground up to the top of the waist, or in using the slope of the waistband from a front view.

Jacket seat is determined by calculation based on chest and waist measurements, and seat choice given by the subject (flat, normal or prominent). The knee and bottom of pants are calculated based on the diameter of the pant in the knee or bottom area as viewed from the front, back or side. The half waist and half back, measured from the edge seam to the center of the garment, are calculated from the front and rear views respectively.

Circumference measurements are measurements such as chest, waist, seat, overarms, stomach, neck, biceps, stride, knee and bottom, and are either provided by the subject or are calculated by formula, since they cannot be measured directly by the camera. In one embodiment, chest, waist, stomach and neck are given by the subject, with the remaining measurements calculated by the formula.

Vertical measurements are measurements such as left and right inseam/outseam, rise, jacket or shirt body length, jacket or shirt sleeve length, vest back and vest opening. Left and right outseam, body length, sleeve length, vest opening, and front and back length are determined by the camera, with the height given by the subject and used for scale for the other measurements. Rise is calculated by formula based on height, wherein different rise is given for a pleated pants than flat front pants, or fit reference. Inseam is the difference between outseam and rise.

Horizontal measurements are measurements such as point to point, half back, shoulder heights, shoulder low, body indents, waist front height and back height for the pants. All of these measurements are determined by the camera except the half back, which is provided by formula and changes according to the point to point and fit preference.

Calculations of the system may be verified, where possible, by comparison with measured values. For example, the inseam is calculated from the outseam using a reduction formula. However, from the front or rear view the inseam may be visible and may be measured accordingly and cross-referenced with the calculated value. The calculations from the photos and the values given by the subject correlate with a predetermined size chart design, which may then be adjusted according to further factors considered below.

A size chart design may appear as follows: For a normal body type and moderate fit, of chest 40" and waist 34", the standard seat is 42", a very flat seat is 40½" a flat seat is 41", while the half-back is 7 for a flat half-back, 8 for a normal half-back and 9½" for a prominent half-back. The formula for determining half-back may be related to the point to point, whether the subject's back is rounded or erect, the prominence of the blades, and the fit preference. The pant or trouser measurements for this type would be 34" waist, 42½" waist, 10" rise, 27¾" thighs, 20¼" knee, and 17½" bottom.

Based on the user's provision of body type, normal, athletic or stout, the calculated values may be adjusted. For example, for a stout body type, firstly the stomach measurement would be required, and then altered by providing greater width of the front of the garment as compared to the rear of the garment. For example, for an athletic body type, the garment may be altered by adding double hip darts for pants, a chest dart, darts under the front pockets of ½", ⅜" added to the half waist if the drop is 8 inches or more (6" drop), and side vents may be recommended.

Posture adjustment is possible based on the subject's body stance (for example erect, normal, stoop, sway or head forward). If a subject has an erect stance, for example, in comparison with a normal "template" suit jacket for that chest and stature (for example 42T), the jacket front may be lengthened by ½", the jacket back will be shortened by ½", arms are swung back 1", darts under the front jacket pockets are ½" offset, the collar is lowered ⅜", and ½" is added on the jacket seat. An automatic adjustment may be made for posture assuming that the subject will stand straighter in the photos than normal posture.

The further information that is provided by the subject may also be used to adjust the garment. For example, a curved or rounded back will result in a lengthening of the jacket back of ½", ⅛" is added to the half back, the collar is pinched ½" for normal or high shoulders, while for sloping shoulders the collar is pinched ¾". This does not apply for an erect stature or a prominent chest. If the stomach is a little flat, then ⅜" is removed from the standard half waist, and if it is a little forward then ⅜" is added over the standard half waist, as an example. The formula for half-waist may be related to waist size and stomach size if the subject is stout.

A further adjustment to measurements may be made based on fit preference or personal preference. Some examples of fit preference are classic, moderate, trim and slim. With a shoulder point-to-point measurement, of 19", a classic fit will also have a 19" width, whereas a moderate fit will lose ⅜" for a width of 18⅝", a trim fit will lose ⅝" for a width of 18⅜", and a slim fit will lose ⅞" for a width of 18⅛". Jacket length may be adjusted according to fit preference. For a 19" width, a classic fit half-back will be 9¼", a moderate fit half-back will be 9⅛".

In an embodiment, the height, chest, neck or collar size, and waist, and stomach (if stout) are given by the subject. The system determines, from the photos, the point-to-point, arm position, shoulder heights, whether there is a low shoulder, the sleeve length (taken from the top end of the shoulder to the hand wrist bone), the coat length (from the back) and the body indents (from the side). From the photos it also determines front waist height, rear waist height, back length, front length, yoke and body length. From these values, the system calculates the jacket half waist, jacket seat, the half back and biceps, as well as the seat, rise, stride, knee and bottom, as well as the vest opening.

In an embodiment, once the measurements are determined, the measured garment may be positioned on a mannequin or virtual model of the subject, so that the subject can see how the garment would look. The subject may tweak or adjust various measures of the fit, for example, adjusting the sleeves for their preferred length or adjusting the pant legs for a certain break characteristic. The virtual model may comprise one or more of the subject photos, so that the subject body shape is shown under the garment, as well as distinguishing features such as the face of the subject.

For a woman, two additional measurements may be taken from the photos: bust width is measured from nipple to nipple, and shoulder bust is measured from shoulder seam to largest area of the bust. For women, the chest circumference is a bust circumference.

In an embodiment, the measurement information is shared with garment manufacturers and tailors, where required in the manufacture of a made-to-measure garment. The measurements may also be used by off-the-rack clothing manufacturers to suggest the closest size, based on comparison with the manufacturer's measurements, for use in online shopping for example.

I claim:

1. A computer-implemented method for determining a subject's fitment for a garment, comprising the steps of:
   a. receiving a body type;
   b. receiving a body stance;
   c. receiving two or more photos of the subject comprising at least a side view photo and a front or rear view photo;
   d. determining a scale of each of the two or more photos using a processor;
   e. determining a point to point measurement from the front or rear view photo;
   f. determining a shoulder height measurement from the front or rear view photo;
   g. determining one or more body indent measurements from the side view photo, wherein the one or more body indents are determined by virtually positioning the shoulder blades against a vertical reference, and measuring a head indent, a neck indent, a waist indent and a seat indent from the vertical reference;
   h. determining a sleeve length measurement from the two or more photos;
   i. determining a body length measurement from the front or rear view photo; and
   j. calculating further measurements, wherein the processor determines the point to point measurement, the shoulder height measurement, the one or more body indents, the sleeve length measurement, and the body length measurement using the scale, and wherein the processor uses one or more formulae to calculate the further measurements from the body type, the body stance and the determined measurements.

2. The method of claim 1, further comprising the step of:
   a. receiving one or more measurements comprising at least a height from the subject.

3. The method of claim 2, wherein the one or more measurements further comprise a circumference of the chest, the waist and the neck.

4. The method of claim 3, wherein the one or measurements further comprise a circumference of the stomach.

5. The method of claim 1 wherein the photos are taken using a depth-sensing camera.

6. The method of claim 1, further comprising the step of:
   a. determining an outseam from the side view photo wherein the processor uses the scale to determine the outseam.

7. The method of claim 6, wherein the outseam is determined from each of a right side view photo and a left side view photo.

8. The method of claim 1, further comprising the step of receiving further information from the subject on fit preference.

9. The method of claim 1, wherein the determined measurements and calculated measurements form a fit profile for the subject and the fit profile is shared with garment manufacturers.

* * * * *